(12) United States Patent
Jung et al.

(10) Patent No.: US 11,493,646 B2
(45) Date of Patent: Nov. 8, 2022

(54) UNDERWATER RADIATION MONITORING SYSTEM AND METHOD

(71) Applicant: KOREA ATOMIC ENERGY RESEARCH INSTITUTE, Daejeon (KR)

(72) Inventors: Sung Hee Jung, Gongju-si (KR); Jin Ho Moon, Daejeon (KR); Jang Guen Park, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 263 days.

(21) Appl. No.: 17/079,858

(22) Filed: Oct. 26, 2020

(65) Prior Publication Data
US 2021/0208288 A1 Jul. 8, 2021

(30) Foreign Application Priority Data
Dec. 9, 2019 (KR) .......................... 10-2019-0162679

(51) Int. Cl.
*G01T 1/20* (2006.01)
*G01T 1/169* (2006.01)

(52) U.S. Cl.
CPC .................................... *G01T 1/169* (2013.01)

(58) Field of Classification Search
CPC ........... G01T 1/169; G01T 7/00; G01T 1/167; G01T 1/24; G08C 17/02
See application file for complete search history.

(56) References Cited

U.S. PATENT DOCUMENTS

2011/0077799 A1* 3/2011 Barnes ...................... G01T 1/20
250/371

FOREIGN PATENT DOCUMENTS

| CN | 206348463 U | 7/2017 | |
|---|---|---|---|
| CN | 109110060 A | 1/2019 | |
| FR | 2933777 A1 * | 1/2010 | ............... G01T 7/00 |
| GB | 2521765 A * | 7/2015 | ............... G01N 9/24 |
| JP | 2015-531052 A | 10/2015 | |

(Continued)

OTHER PUBLICATIONS

Japanese Office Action dated Sep. 14, 2021, in connection with the Japanese Patent Application No. 2020-170566.
(Continued)

*Primary Examiner* — Kiho Kim
(74) *Attorney, Agent, or Firm* — Hauptman Ham, LLP (57) ABSTRACT

Provided are an underwater radiation monitoring system and method. The monitoring system includes a plurality of sensors configured to measure a value of underwater radiation in a measurement area in which underwater radiation is to be measured, the plurality of sensors being installed in the measurement area by being arranged in a form which is set on the basis of information about the measurement area; and an electronic device configured to identify a value of underwater radiation in the measurement area on the basis of the values of underwater radiation measured by the plurality of sensors, wherein at least one first sensor among the plurality of sensors is connected to the electronic device to collect measured values obtained from the at least one first sensor and a plurality of second sensors excluding the at least one first sensor and to transmit the collected measured values to the electronic device.

11 Claims, 6 Drawing Sheets

(56) References Cited

FOREIGN PATENT DOCUMENTS

JP          2016-109497 A     6/2016
KR     10-2019-0043048 A     4/2019

OTHER PUBLICATIONS

Naveen Kumar Gupta et al., 3D geographical routing protocols in wireless ad hoc and sensor networks: an overview. Wireless Networks, pp. 2549-2566, Apr. 22, 2019.
K.G. Kebkal et al., Solutions for Underwater Communication and Positioning Network Development, ISSN2075-1087 Gyroscopy and Navigation, 2019, vol. 10, No. 3, pp. 161-179, May 21, 2019.
Wenjuan Wang et al., Sensor network based radiation detection for emergency system, Cluster Computing (2019) 22:S2981-S2992, Jan. 15, 2018.
Wang Yu et al., Three-Dimensional Ocean Sensor Networks: A Survey, ISSN 1672-5182,2012 11 (4): pp. 436-450, Sep. 25, 2012.
Korean Office Action dated Apr. 12, 2021, in connection with the Korean Patent Application No. 10-2019-0162679.
Extended European Search Report dated Apr. 16, 2021 in connection with the counterpart European Patent Application No. EP20209341.5.

\* cited by examiner

UNDERWATER RADIATION MONITORING SYSTEM AND METHOD

CROSS-REFERENCE TO RELATED APPLICATION

This application claims priority to and the benefit of Korean Patent Application No. 2019-0162679, filed on Dec. 9, 2019, the disclosure of which is incorporated herein by reference in its entirety.

BACKGROUND

1. Field of the Invention

The present disclosure relates to an underwater radiation monitoring system and method.

2. Discussion of Related Art

When the Fukushima Daiichi nuclear disaster occurred, accident handling was delayed due to lack of initial response measures and there are still difficulties in recovery after many years. In particular, radioactive waste was lost into rivers and the like due to natural disasters such as typhoons but the amount of lost radioactive waste, locations of the loss, and the like have not yet been identified.

Due to the characteristics of radiation, an effective range of measurement in water is very limited and measurement can be performed only for radiation sources in the vicinity of a radius of about 30 cm from the center of a radiation sensor. In particular, such a radiation sensor is manufactured based on a high-vacuum photomultiplier and thus is vulnerable to external impacts, has a large size, and requires a high voltage of about 1000 V or more to be applied thereto. Therefore, locations where the radiation sensor can be installed are very limited. In addition, due to these problems, it is difficult to measure a value of radiation that may represent an entire hydrosphere.

SUMMARY OF THE INVENTION

To address these problems, embodiments of the present disclosure provide an underwater radiation monitoring system and method in which a plurality of small sensors are connected through a network and are installed in a direction perpendicular or parallel to the surface of the water to extend a range of measurement of underwater radiation.

According to one aspect of the present disclosure, an underwater radiation monitoring system includes a plurality of sensors configured to measure a value of underwater radiation in a measurement area in which underwater radiation is to be measured, the plurality of sensors being installed in the measurement area by being arranged in a form which is set on the basis of information about the measurement area; and an electronic device configured to identify the value of underwater radiation in the measurement area on the basis of the values of underwater radiation measured by the plurality of sensors, wherein at least one first sensor among the plurality of sensors is connected to the electronic device to collect measured values obtained from the at least one first sensor and a plurality of second sensors excluding the at least one first sensor and to transmit the collected measured values to the electronic device.

Each of the plurality of sensors may include four or more connectors.

Each of the plurality of sensors may be connected to adjacent sensors through at least some of the connectors.

A serial number may be assigned to each of the plurality of sensors.

The plurality of second sensors may transmit the measured values to the at least one first sensor according to a scenario preset based on the serial numbers.

When an error occurs in at least one second sensor among the plurality of second sensors, all the values measured by the second sensors, excluding the at least one second sensor in which the error occurs, may be transmitted to the at least one first sensor while bypassing the at least one second sensor in which the error occurs.

The plurality of sensors may be arranged in a mesh form, a ring form, a tree form, or a parallel form on the basis of the information about the measurement area including a depth of water, an area, and a flow rate of water of the measurement area.

According to another aspect of the present disclosure, an underwater radiation monitoring method includes selecting, by an electronic device, a measurement area in which underwater radiation is to be measured; setting, by the electronic device, a layout of a plurality of sensors on the basis of information about the measurement area, the plurality of sensors including at least one first sensor and a plurality of second sensors; receiving, by the electronic device, measured values, which are obtained from the at least one first sensor and the plurality of second sensors, from the at least one first sensor when installation of the plurality of sensors in the layout in the measurement area is completed; and identifying a value of underwater radiation in the measurement area on the basis of the received measured values.

The underwater radiation monitoring method may further include assigning a serial number to each of the plurality of sensors after the setting of the layout.

The receiving of the measured values from the at least one first sensor may include transmitting the measured values obtained from the plurality of second sensors to the at least one first sensor according to a scenario preset on the basis of the serial numbers.

The receiving of the measured values from the at least one first sensor may include, when an error occurs in at least one second sensor among the plurality of second sensors, transmitting all the values measured by the second sensors, excluding the at least one second sensor in which the error occurs, to the at least one first sensor while bypassing the at least one second sensor in which the error occurs.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present disclosure will be described in detail with reference to the accompanying drawings. A detailed description provided below together with the accompanying drawings is intended to describe example embodiments of the present disclosure and should not be understood to represent only one embodiment in which the present disclosure can be implemented. For clarity, parts not related to explaining the present disclosure are omitted in the drawings and the same reference numerals may be used for the same or like components throughout the specification.

In one embodiment of the present disclosure, terms such as "or" and "at least one" may refer to one of terms listed together or a combination of two or more of them. For example, expressions "A or B" and "at least one of A and B" may refer to only A, only B, or both A and B.

Figure 1:
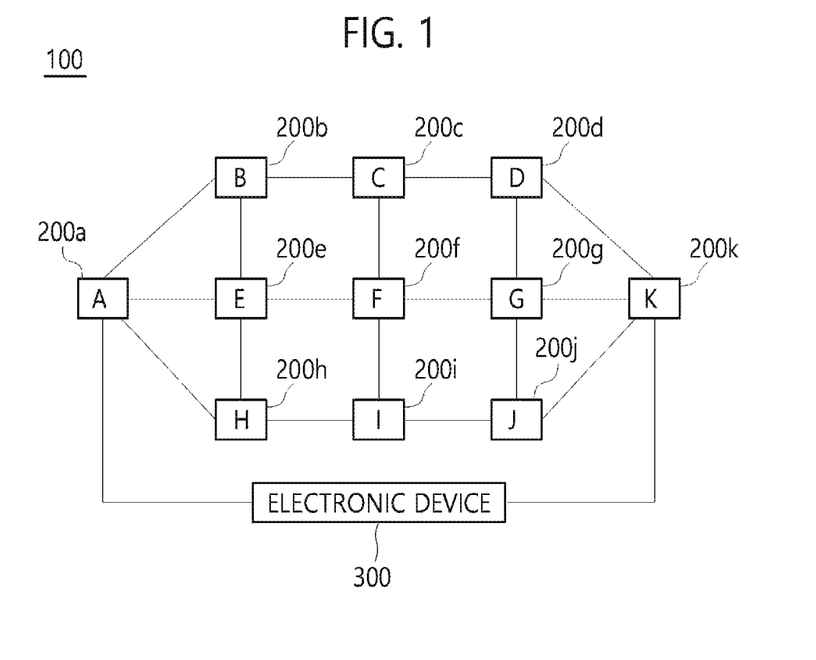
FIG. 1 is a diagram illustrating an underwater radiation monitoring system according to an embodiment of the present disclosure.
Figure 2:
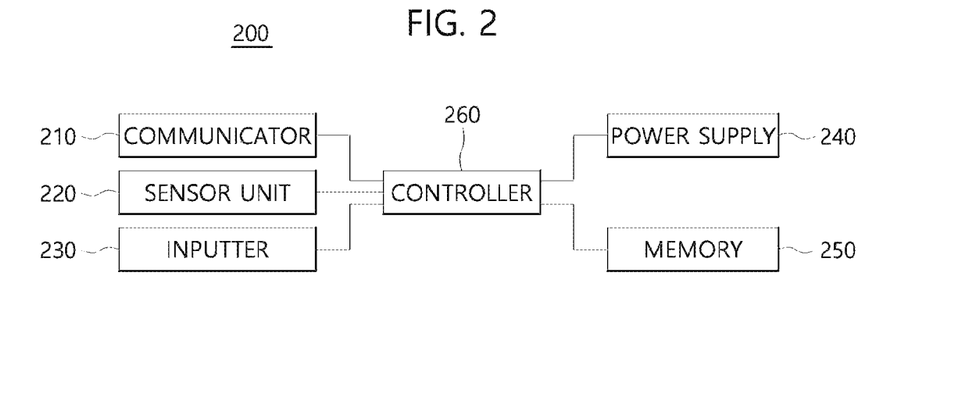
FIG. 2 is a diagram illustrating components of a sensor for monitoring underwater radiation according to an embodiment of the present disclosure.
Figure 3:
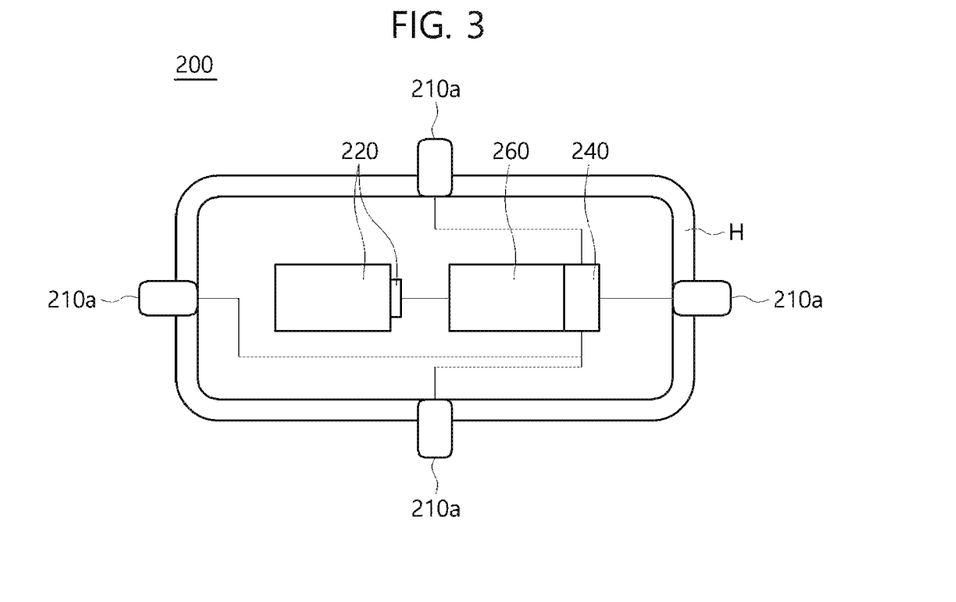
FIG. 3 is a diagram illustrating a configuration of a sensor for monitoring underwater radiation according to an embodiment of the present disclosure.

FIG. 1 is a diagram illustrating an underwater radiation monitoring system according to an embodiment of the present disclosure. FIG. 2 is a diagram illustrating components of a sensor for monitoring underwater radiation according to an embodiment of the present disclosure. FIG. 3 is a diagram illustrating a configuration of a sensor for monitoring underwater radiation according to an embodiment of the present disclosure.

Referring to FIGS. 1 to 3, a monitoring system 100 according to the present disclosure includes a plurality of sensors 200 and an electronic device 300.

The plurality of sensors 200a to 200k are sensors installed to be parallel or perpendicular to the surface of the water to measure a value of radiation in the water, and transmit the value of radiation measured in the water to the electronic device 300.

A configuration of a sensor 200 illustrated in FIGS. 2 and 3 is that of one of the plurality of sensors 200a to 200k. The sensor 200 includes a communication unit 210, a sensor unit 220, an input unit 230, a power supply 240, a memory 250, and a controller 260 and such a configuration may be applied to the other sensors. In addition, in one embodiment of the present disclosure, a sensor A 200a will be described as an example.

The communication unit 210 communicates with an external device, e.g., another sensor or the electronic device 300. To this end, a plurality of connectors, e.g., four connectors 210a, to which communication lines (not shown) are fastened may be provided in a housing H of the sensor 200. The connectors 210a are connected to the power supply 240 to supply power to the power supply 240. In addition, both ends of the communication line fastened to the connectors 210a may be configured as waterproof connection terminals so that the connection terminals may be fastened to the connectors 210a, and the communication line may be formed of a metal material having high tensile strength. For example, through the communication line, communication may be established among a sensor B 200b, a sensor E 200e, a sensor H 200h, and the electronic device 300, and power may be supplied from the electronic device 300 to the sensor B 200b, the sensor E 200e, and the sensor H 200h. In addition, the communication line may allow the controller 260 to identify the states of a plurality of sensors connected to the communication lines by transmitting a connectivity check protocol to or receiving a connectivity check protocol from the plurality of sensors. In an embodiment of the present disclosure, the four connectors 210a are described as an example but embodiments are not limited thereto and four or more connectors 210a may be provided according to a method in which a plurality of sensors are connected.

Examples of the sensor unit 220 include a radiation measurement sensor that is a scintillation crystal capable of measuring a value of radiation in the water and a semiconductor sensor that digitizes a value of radiation measured by a radiation measurement sensor. The sensor unit 220 provides a result of digitizing the measured value by the semiconductor sensor to the controller 260. As described above, in the present disclosure, the sensor 200 may be manufactured in a small size by applying a semiconductor sensor without using a photomultiplier and thus may be installed in various forms on the surface of the water or underwater to measure a value of radiation underwater in a wide area. In addition, a high voltage is not necessary for the semiconductor sensor unlike a photomultiplier, and thus the durability of the sensor 200 may be improved.

The input unit 230 may generate input data in the sensor 200. The input unit 230 may generate input data for turning on/off power in response to a user input with respect to the sensor 200. To this end, the input unit 230 may include an input part such as a physical button.

The power supply 240 receives power to operate the sensor 200 from the outside through the communication line connected to the connectors 210a.

The memory 250 may store programs for operating the sensor unit 220. In addition, the memory 250 may store a serial number assigned to the sensor 200 by the electronic device 300 and the like.

The controller 260 is connected to the sensor unit 220 to receive a digitized measurement value, i.e., sensing data, from the sensor unit 220. The controller 260 transmits the sensing data to a sensor connected thereto through the communication unit 210. In this case, the controller 260 identifies a serial number thereof stored in the memory 250 and maps the serial number to the sensing data obtained from the sensor unit 220. In addition, the controller 260 transmits the sensing data to the electronic device 300. In this case, the sensor A 200a maps a serial number thereof to the sensing data and transmits a result of the mapping to the electronic device 300. In this case, the sensor A 200a may collect sensing data received from the sensor B 200b to the sensor K 200k and transmit the collected sensing data to the electronic device 300. Each of the sensor B 200b, the sensor E 200e, and the sensor H 200h connected to the sensor A 200a map a serial number thereof to the sensing data and transmit a result of the mapping to the sensor A 200a together with sensing data transmitted from other sensors connected thereto.

The electronic device 300 is a device configured to identify a value of radiation underwater where the plurality of sensors 200a to 200k are installed by receiving values of radiation underwater obtained from the plurality of sensors 200a to 200k and may be a computer, a tablet personal computer (PC), or the like.

More specifically, information about a measurement area in which underwater radiation is to be measured may be input to the electronic device 300, and the electronic device 300 may set a layout of the plurality of sensors 200a to 200k to be installed in the measurement area. The electronic device 300 may provide map data to a user to receive the information about the measurement area from the user and receive an address of the measurement area from the user. After the information about the measurement area is input, the electronic device 300 sets the layout of the sensors 200a to 200k according to a user input. The layout may include a mesh form, a tree form, a parallel form, a ring form, and the like. One embodiment of the present disclosure will be described with respect to the mesh form as shown in FIG. 1.

The electronic device 300 sets the sensor A 200a and the sensor K 200k as master sensors among the plurality of sensors 200a to 200k set in the mesh form and sets the sensor B 200b to the sensor J 200j as slave sensors. The master sensors and the slave sensors are set for convenience of description, and any one of the plurality of sensors 200a to 200k may be set as a master sensor. In this case, the sensor A 200a and the sensor K 200k are sensors for communication with the electronic device 300 and thus may be set as master sensors. The electronic device 300 assigns a serial number to each of the sensor A 200a to the sensor K 200k. Each of the plurality of sensors 200a to 200k may store the serial number assigned thereto.

Furthermore, the electronic device 300 may set priorities and a scenario on the basis of the serial numbers assigned to the plurality of sensors 200a to 200k. More specifically, the electronic device 300 may assign a first priority to the sensor A 200a, assign a second priority to the sensor B 200b, the sensor E 200e, and the sensor H 200h which are connected to the sensor A 200a, assign a third priority to the sensor C 200c, the sensor F 200f, and the sensor I 200i which are connected to the sensors assigned the second priority, and assign a fourth priority to the sensor D 200d, the sensor G 200g, and the sensor J 200j which are connected to the sensors assigned the third priority. In addition, the sensor K 200k may be assigned a fifth priority and thus operate as a slave sensor when the sensor A 200a operates normally, and the priorities assigned to the sensor B 200b to the sensor J 200j may be changed on the basis of the sensor K 200k when an error occurs in the sensor A 200a and thus the sensor K 200k communicates with the electronic device 300.

The electronic device 300 may set a scenario for transmitting signals measured by the sensor B 200b to the sensor K 200k to the sensor A 200a. For example, the electronic device 300 may set a scenario in which sensing data obtained from the sensor B 200b to the sensor J 200j is collected by the sensor A 200a in a path from the sensor K 200k, the sensor D 200d, the sensor C 200c, the sensor B 200b, the sensor A 200a, the sensor K 200k, the sensor G 200g, the sensor F 200f, the sensor E 200e, the sensor A 200a, the sensor K 200k, the sensor J 200j, the sensor I 200i, the sensor H 200h, and to the sensor A 200a.

When the scenario is set as described above, the plurality of sensors 200a to 200k transmit and receive sensing data on the basis of the set scenario. However, when an error occurs in at least one of the plurality of sensors 200a to 200k, sensing data may be transmitted to the sensor A 200a according to a temporary scenario different from the set scenario. For example, when an error occurs in the sensor F 200f, sensing data obtained from the sensor G 200g connected to the sensor F 200f and sensing data obtained at a position at which the sensor F 200f is disposed cannot be transmitted to the sensor A 200a. Therefore, the sensor G 200g assigned the fourth priority may transmit the sensing data to one of the sensor D 200d and the sensor J 200j which are connected to the sensor G 200g so as to transmit the sensing data to the sensor C 200c and the sensor I 200i which are assigned the third priority.

When the sensor D 200d or the sensor J 200j transmits sensing data obtained by itself to the sensor C 200c or the sensor I 200i, the sensing data related to the sensor G 200g may be also transmitted. Therefore, the sensor A 200a may collect sensing data related to all the sensor B 200b to the sensor E 200e and the sensor G 200g to the sensor K 200k excluding the sensor F 200f in which an error has occurred. The priorities, the scenario, and the temporary scenario may be changed and applied according to the arrangement of the plurality of sensors 200a to 200k.

The electronic device 300 analyzes the sensing data received from the sensor A 200a and the sensor K 200k and displays a result of analyzing the sensing data. In this case, the electronic device 300 may approximately identify locations of the plurality of sensors 200a to 200k, and thus a location at which a value of radiation is equal to or greater than a threshold may be identified according to the result of analyzing the sensing data.

Figure 4:
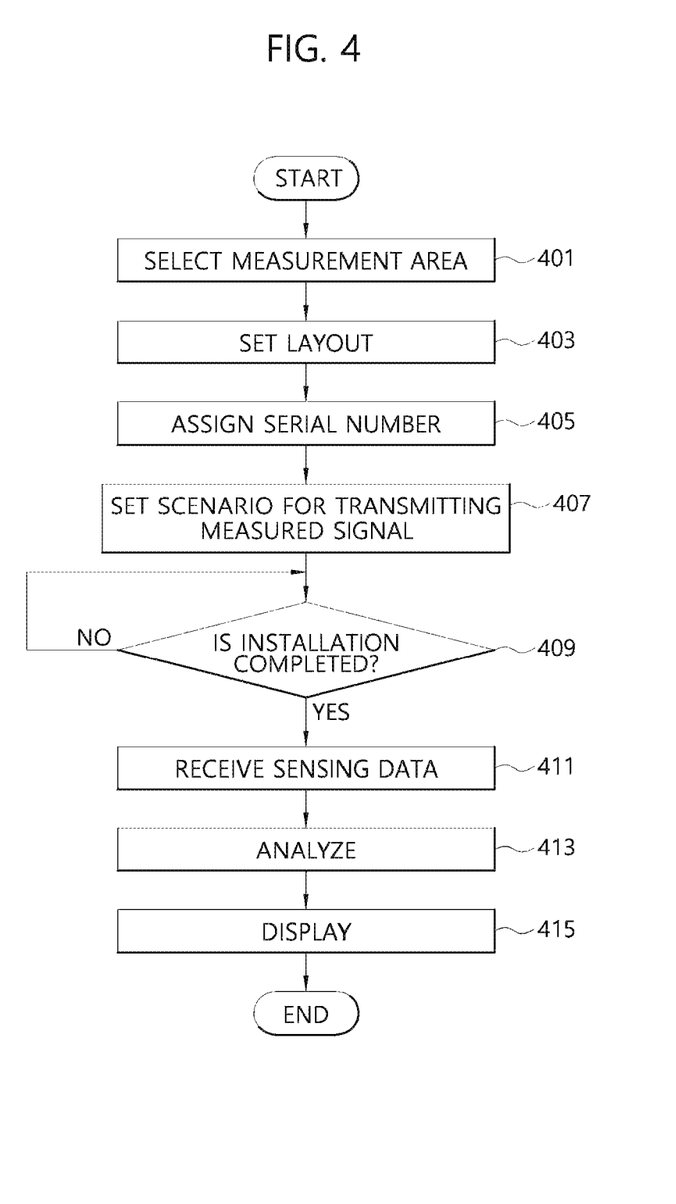
FIG. 4 is a flowchart of a method of monitoring underwater radiation according to an embodiment of the present disclosure.

FIG. 4 is a flowchart of a method of monitoring underwater radiation according to an embodiment of the present disclosure.

Figure 5A:
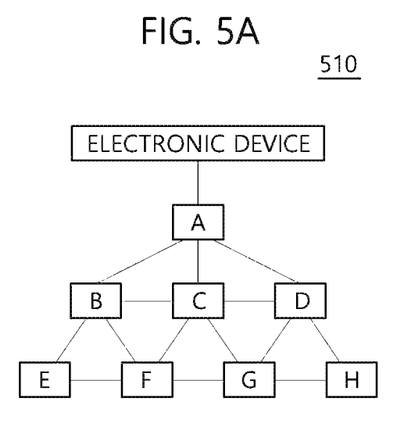
FIGS. 5A to 5C are diagrams illustrating examples of an underwater radiation monitoring system according to embodiments of the present disclosure.
Figure 5B:
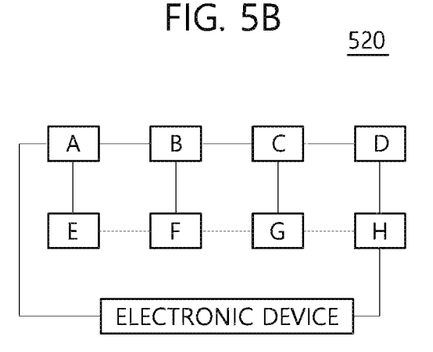
Figure 5C:
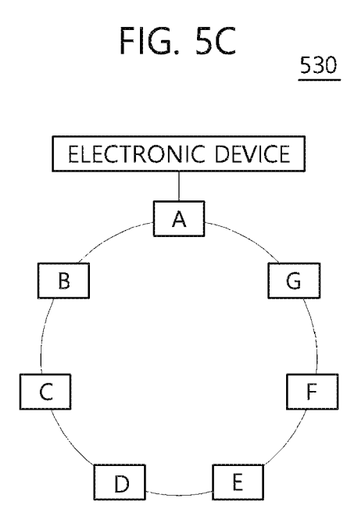

Referring to FIG. 4, in operation 401, the electronic device 300 receives, from a user, information about a measurement area selected, in which the monitoring system 100 is to be installed to measure radiation underwater. In this case, the user may input the measurement area or the address of the measurement area on the basis of map data provided by the electronic device 300. In operation 403, the electronic device 300 sets a layout of the plurality of sensors 200a to 200k according to a user input. The layout may include a mesh form, a tree form, a parallel form, a ring form, etc. The mesh form is as illustrated in FIG. 1, and the tree form, the parallel form and the ring form are as respectively illustrated in FIGS. 5A, 5B and 5C. FIGS. 5A to 5C are diagrams illustrating examples of an underwater radiation monitoring system according to embodiments of the present disclosure.

FIG. 5A illustrates a monitoring system 510 in which a plurality of sensors 200 are arranged in the tree form. FIG. 5B illustrates a monitoring system 520 in which a plurality of sensors 200 are arranged in the parallel form. FIG. 5C illustrates a monitoring system 530 in which a plurality of sensors 200 are arranged in the ring form. In addition, FIGS. 5A and 5C illustrate examples in which one sensor A communicates with the electronic device 300 but the embodiments are not limited thereto. As illustrated in FIGS. 1 and 5B, a sensor capable of communicating with the electronic device 300 may be additionally set for a case in which the sensor A cannot communicate with the electronic device 300 due to an error occurring in the sensor A. A user may set a layout of the plurality of sensors 200 on the basis of information about a measurement area in which the plurality of sensors 200 are to be installed. In this case, the information about the measurement area may include a depth of water, an area, and a flow rate of water of the measurement area.

In addition, each of the plurality of sensors 200 may be connected to at least two adjacent sensors. Therefore, even when an error occurs in any one of the plurality of sensors 200, sensing data measured by all the sensors 200 excluding the sensor 200 in which the error occurs may be obtained while bypassing the sensor 200 in which the error occurs, thereby improving accuracy of a value of radiation measured underwater.

In operation 405, the electronic device 300 assigns a serial number to each of the plurality of sensors 200 of the monitoring system 100. In operation 407, the electronic device 300 may set a scenario for transmitting signals measured by the sensor B 200*b* to the sensor K 200*k* to the sensor A 200*a*. For example, the electronic device 300 may set a scenario in which sensing data obtained from the sensor B 200*b* to the sensor K 200*k* is collected by the sensor A 200*a* in a path from the sensor K 200*k*, the sensor D 200*d*, the sensor C 200*c*, the sensor B 200*b*, the sensor A 200*a*, the sensor K 200*k*, the sensor G 200*g*, the sensor F 200*f*, the sensor E 200*e*, the sensor A 200*a*, the sensor K 200*k*, the sensor J 200*j*, the sensor I 200*i*, the sensor H 200*h*, and to the sensor A 200*a*.

In operation 409, the electronic device 300 performs operation 411 when it is determined that installation of the monitoring system 100 is completed and continuously checks whether the installation of the monitoring system 100 is completed when it is determined that the installation of the monitoring system 100 is not completed. In operation 411, the electronic device 300 receives sensing data corresponding to the signals measured by the sensor A 200*a* and the sensor K 200*k* and performs operation 413. In operation 413, the electronic device 300 analyzes the sensing data. In operation 415, the electronic device 300 displays a result of analyzing the sensing data. In this case, the electronic device 300 may approximately identify locations of the plurality of sensors 200*a* to 200*k* and thus identify a location at which a value of radiation is equal to or greater than a threshold according to the result of analyzing the sensing data.

Figure 6A:
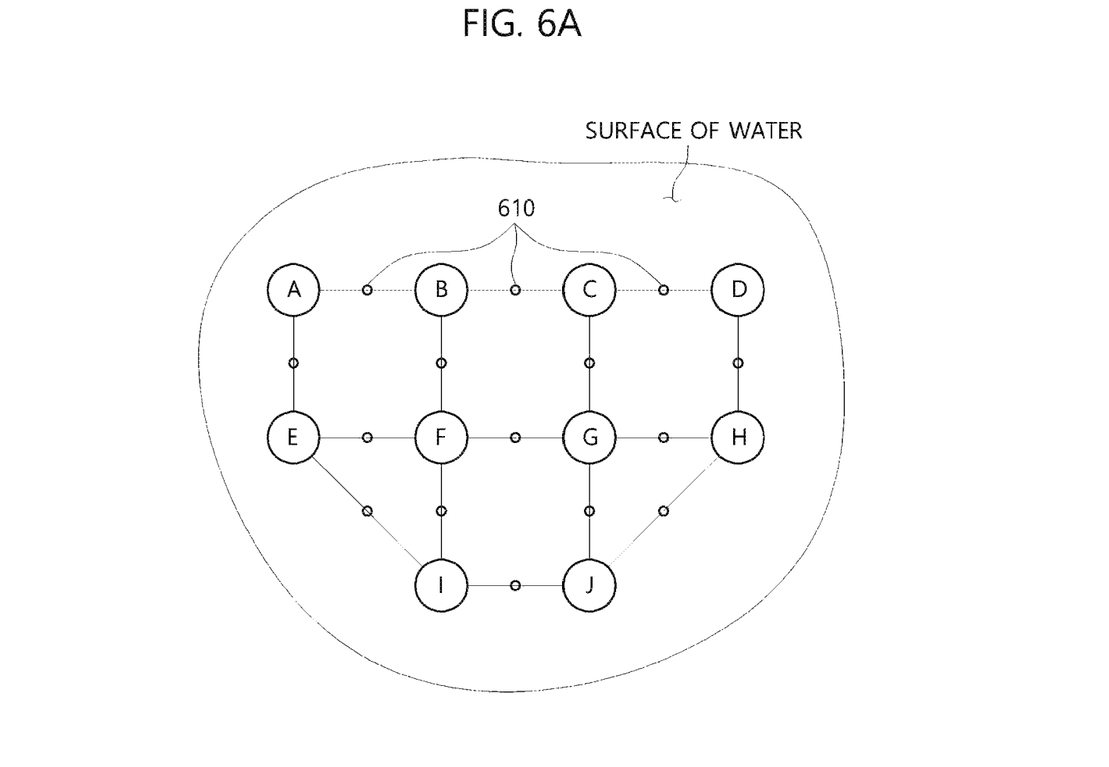
FIGS. 6A and 6B are diagrams illustrating examples of a sensor for monitoring underwater radiation according to embodiments of the present disclosure.
Figure 6B:
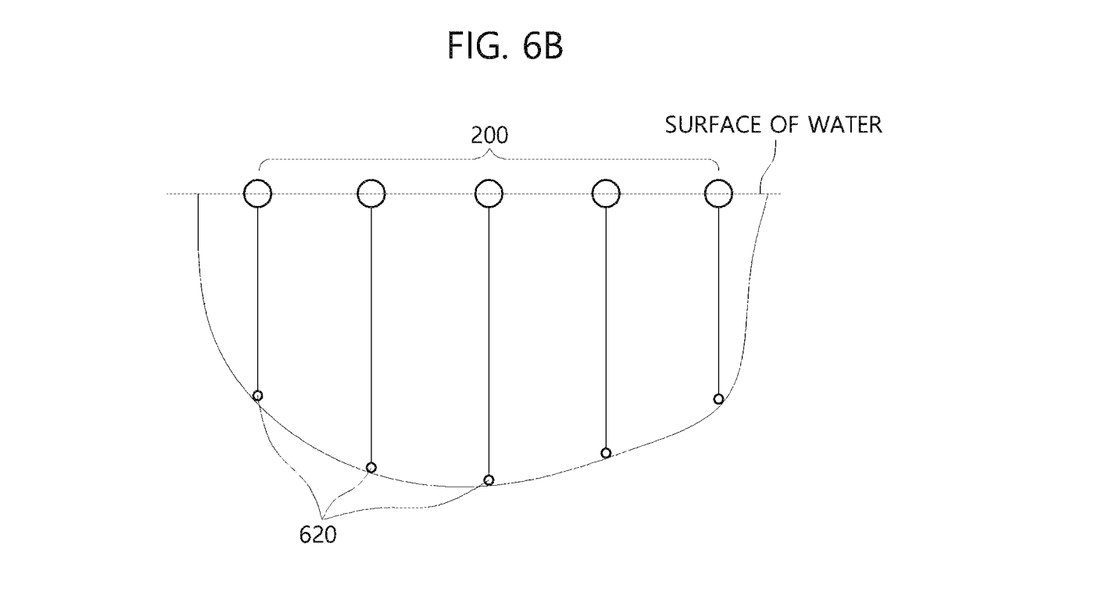

FIGS. 6A and 6B are diagrams illustrating examples of a sensor for monitoring underwater radiation according to embodiments of the present disclosure.

FIG. 6A illustrates an example in which a plurality of sensors 200 are installed on the surface of the water. As illustrated in FIG. 6A, the plurality of sensors 200 are immersed to a certain depth or more in the water to measure a value of radiation in the water. To this end, each of the plurality of sensors 200 may be connected to at least two adjacent sensors through communication lines, and at least one buoy 610 is installed on the communication line so that the sensors 200 may be widely disposed on the surface of the water.

Referring to FIG. 6B, a weight 620 is attached to each of the plurality of sensors 200 to set the plurality of sensors 200 to be arranged in a direction perpendicular to the surface of the water, i.e., a water-depth direction. In this case, the type of the weight 620 may vary according to the positions of the sensors 200 for monitoring underwater radiation or a purpose of monitoring radiation.

As described above, in an underwater radiation monitoring system and method according to the present disclosure, a plurality of small sensors can be connected through a network and installing in a direction perpendicular or parallel to the surface of the water to expand a range of measuring radiation underwater, thereby improving the accuracy of measuring radiation underwater.

In addition, in the underwater radiation monitoring system and method according to the present disclosure, a photomultiplier is not used, thus reducing the size and price of sensors.

The embodiments of the present disclosure set forth in the present specification and drawings are merely intended to provide examples to easily explain the technical matters of the present disclosure and help understanding of the present disclosure and are not intended to limit the scope of the present disclosure. Therefore, it should be understood that all changes or modified forms derivable based on the technical idea of the present disclosure are included in the scope of the present disclosure, as well as the embodiments set forth herein.

What is claimed is:

1. An underwater radiation monitoring system comprising:
   a plurality of sensors configured to measure a value of underwater radiation in a measurement area in which underwater radiation is to be measured, the plurality of sensors being installed in the measurement area by being arranged in a form which is set on the basis of information about the measurement area; and
   an electronic device configured to identify the value of underwater radiation in the measurement area on the basis of the values of underwater radiation measured by the plurality of sensors,
   wherein at least one first sensor among the plurality of sensors is connected to the electronic device to collect a measured value obtained from the at least one first sensor and measured values obtained from a plurality of second sensors excluding the at least one first sensor and to transmit the collected measured values to the electronic device.

2. The underwater radiation monitoring system of claim 1, wherein each of the plurality of sensors comprises four or more connectors.

3. The underwater radiation monitoring system of claim 2, wherein each of the plurality of sensors is connected to adjacent sensors through at least some of the connectors.

4. The underwater radiation monitoring system of claim 3, wherein a serial number is assigned to each of the plurality of sensors.

5. The underwater radiation monitoring system of claim 4, wherein the plurality of second sensors transmit the measured values to the at least one first sensor according to a scenario preset based on the serial numbers.

6. The underwater radiation monitoring system of claim 5, wherein, when an error occurs in at least one second sensor among the plurality of second sensors, all the values measured by the second sensors, excluding the at least one second sensor in which the error occurs, are transmitted to the at least one first sensor while bypassing the at least one second sensor in which the error occurs.

7. The underwater radiation monitoring system of claim 1, wherein the plurality of sensors are arranged in a mesh form, a ring form, a tree form, or a parallel form on the basis of the information about the measurement area including a depth of water, an area, and a flow rate of water of the measurement area.

8. An underwater radiation monitoring method comprising:
   selecting, by an electronic device, a measurement area in which underwater radiation is to be measured;
   setting, by the electronic device, a layout of a plurality of sensors on the basis of information about the measurement area, the plurality of sensors including at least one first sensor and a plurality of second sensors;
   receiving, by the electronic device, from the at least one first sensor a measured value obtained from the at least one first sensor and measured values obtained from the plurality of second sensors when installation of the plurality of sensors in the layout in the measurement area is completed; and
   identifying a value of underwater radiation in the measurement area on the basis of the received measured values.

9. The underwater radiation monitoring method of claim 8, after the setting of the form of arrangement, further comprising assigning a serial number to each of the plurality of sensors.

10. The underwater radiation monitoring method of claim 9, wherein the receiving of the measured values from the at least one first sensor comprises transmitting the measured values obtained from the plurality of second sensors to the at least one first sensor according to a scenario preset on the basis of the serial numbers.

11. The underwater radiation monitoring method of claim 9, wherein the receiving of the measured values from the at least one first sensor comprises, when an error occurs in at least one second sensor among the plurality of second sensors, transmitting all the values measured by the second sensors, excluding the at least one second sensor in which the error occurs, to the at least one first sensor while bypassing the at least one second sensor in which the error occurs.

* * * * *